US010695971B2

(12) United States Patent
Liou et al.

(10) Patent No.: US 10,695,971 B2
(45) Date of Patent: Jun. 30, 2020

(54) PLASTIC FLOORING HAVING REGISTRATION SYSTEM

(71) Applicants: Ting Yi Liou, Tainan (TW); Pei Dong Jhao, Tainan (TW)

(72) Inventors: Ting Yi Liou, Tainan (TW); Pei Dong Jhao, Tainan (TW)

( * ) Notice: Subject to any disclaimer, the term of this patent is extended or adjusted under 35 U.S.C. 154(b) by 102 days.

(21) Appl. No.: 15/871,168

(22) Filed: Jan. 15, 2018

(65) Prior Publication Data

US 2019/0217524 A1  Jul. 18, 2019

(51) Int. Cl.
| | | |
|---|---|---|
| *B29C 59/04* | (2006.01) | |
| *B29C 37/00* | (2006.01) | |
| *B32B 37/00* | (2006.01) | |
| *B32B 38/00* | (2006.01) | |
| *B32B 38/18* | (2006.01) | |
| *B32B 41/00* | (2006.01) | |
| *B32B 38/06* | (2006.01) | |

(52) U.S. Cl.
CPC ........ *B29C 59/046* (2013.01); *B29C 37/0025* (2013.01); *B32B 37/0053* (2013.01); *B32B 38/06* (2013.01); *B32B 38/145* (2013.01); *B32B 38/1825* (2013.01); *B32B 38/1875* (2013.01); *B32B 41/00* (2013.01); *B29C 2037/903* (2013.01); *B29C 2037/906* (2013.01); *B29C 2795/007* (2013.01); *B32B 2419/04* (2013.01)

(58) Field of Classification Search
CPC ..... B29C 59/04; B29C 59/043; B29C 59/046; B29C 37/0025; B29C 2037/903; B29C 2037/906; B29C 2795/007

USPC ................................................. 156/209, 534
See application file for complete search history.

(56) References Cited

U.S. PATENT DOCUMENTS

| | | | | |
|---|---|---|---|---|
| 4,225,374 A | * | 9/1980 | Kaufmann | .............. B32B 37/26 156/220 |
| 5,304,272 A | * | 4/1994 | Rohrbacker | ............ B32B 27/30 156/209 |
| 6,416,607 B1 | * | 7/2002 | Tsai | .................... B32B 38/1833 156/209 |
| 9,296,146 B1 | * | 3/2016 | Thielman | ................ B29C 43/24 |
| 2013/0276965 A1 | * | 10/2013 | Kim | ...................... B29C 59/046 156/209 |
| 2015/0165748 A1 | * | 6/2015 | Anspach | ................. B32B 38/06 156/209 |
| 2017/0361522 A1 | * | 12/2017 | Wang | ..................... B32B 27/08 |

\* cited by examiner

*Primary Examiner* — William V Gilbert

(57) ABSTRACT

Plastic flooring having registration system contains: an electronic control unit electrically connected with roller equipment and the registration system, the roller equipment is configured to deliver a substrate, a printing layer, and an abrasion resistance layer toward a rolling device. The rolling device includes a fourth roller set having pressing patterns identical to surface patterns of the printing layer, and the registration system has a first sensor, a tension regulator, and a second sensor. The first sensor is disposed on a delivery path of the printing layer which corresponds to the first sensor and has multiple positioning points. A length between a first positioning point and a second positioning point depends on a perimeter of the fourth roller set so as to form a print unit, and the first sensor is configured to sense the multiple positioning points and to transmit sensed signals to the electronic control unit.

6 Claims, 8 Drawing Sheets

Dividing of print unit

Dividing of fourth roller set

PLASTIC FLOORING HAVING REGISTRATION SYSTEM

This application is a Continuation-in-Part of application Ser. No. 15/263,393, filed Sep. 13, 2016.

BACKGROUND OF THE INVENTION

Field of the Invention

The present invention relates to plastic flooring having a registration system.

Description of the Prior Art

Referring to FIG. 8, a conventional registration device contains: two electromagnetic discs 61, 62 fixed on two ends of a first roller 1 on a slidable plate 63, a first sensing wire 65 and a second sensing wire 66 which are printed on two sides of a surface skin 2 of the first roller 1, and a sensing device 5. The sensing device 5 includes a first electric eye 64 and a second electric eye 67. A second roller 4 includes a third sensing wire 71 correspond to the second sensing wire 66 of the first roller 1, detection points 72 arranged on one end thereof correspond to the third sensing wire 71, and electric detecting eyes 73. Before the surface skin 2 and a bottom material 3 are rolled by the second roller 4, the sensing device 5 and the electric detecting eyes 73 receive signals and inputs the signal into a computer so that an adjustment unit 60 calculates offset so as to drive a motor 130 to rotate clockwise and counterclockwise, hence the slidable plate 63 move horizontally, and computing units 80 and 70 process the signals and send the signals to the computer 90. When the surface skin 2 operates too fast or slow, the computer controls the two electromagnetic discs 61, 62 to adjust rotation speed of the first roller 1 so that the surface skin 2 and the second roller 4 rolls and produce patterns of plastic floor tiles.

However, the conventional registration device is complicated and cannot adjust an error between the surface skin 2 and the second roller 4 accurately.

Referring to FIG. 9, a CCD sensor 91 senses color code and node on a printing layer 92, but errors of the color code and the node cannot be judged exactly. When the printing layer 92 is delivered slowly, a controller starts a heater 90 to heat the printing layer 92 so as to deliver the printing layer 92 quickly. However, errors between the printing layer and the second roller 4 cannot be adjusted accurately.

The present invention has arisen to mitigate and/or obviate the afore-described disadvantages.

SUMMARY OF THE INVENTION

The primary aspect of the present invention is to provide plastic flooring having a registration system in which the computing module receives sensed values of the first sensors and the second sensor and compares the divided number so as to judge the error between the pressing patterns of the fourth roller set and the surface patterns of the printing layer, thereafter, the tension regulator and the fourth roller set adjust the error so as to position the three-dimensional patterns accurately at a low cost.

To obtain the above aspect, plastic flooring provided by the present invention contains: an electronic control unit electrically connected with roller equipment and the registration system, the roller equipment being configured to deliver a substrate, a printing layer, and an abrasion resistance layer toward a rolling device so that the rolling device rolls the plastic flooring, the rolling device including a fourth roller set having pressing patterns identical to surface patterns of the printing layer, and the registration system having a first sensor, a tension regulator, and a second sensor.

The first sensor is disposed on a delivery path of the printing layer, the printing layer corresponds to the first sensor, the printing layer has multiple positioning points separated from one another, wherein a length between a first positioning point and a second positioning point depends on a perimeter of the fourth roller set so as to form a print unit, and the first sensor is configured to sense the multiple positioning points and to transmit sensed signals to the electronic control unit.

The tension regulator is mounted on a delivery start end of the printing layer so as to adjust tension as delivering the printing layer.

The second sensor is configured to sense rotation location of the fourth roller set, and a perimeter of the fourth roller set is equal to a length of the print unit of the printing layer, wherein the fourth roller set has at least one first start point formed thereon so that the second sensor sends sensed signal of the at least one first start point to the electronic control.

The electronic control unit includes a computing module, when receiving sensed signals of each positioning point of the printing layer, the computing module divides the print unit into several parts evenly and constructs successive delivery simulation of a travel and a transportation speed from a delivery starting point to the fourth roller set; when the electronic control unit receives signals of the at least one first start point of the fourth roller set, the computing module simulates a divided number of the perimeter of the fourth roller set, and the divided number of the perimeter of the fourth roller set is identical to a simulating number of the print unit so as to compare simulated data of the printing layer and that of the fourth roller set, hence when the base, the printing layer, and the abrasion resistance layer are rolled by the fourth roller set, it is possible to judge whether the pressing patterns correspond to the surface patterns of the printing layer.

When a speed of the printing layer is too fast or too slow, the tension regulator adjusts the tension of the printing layer so as to regulate an error between the pressing patterns of the fourth roller set and the surface patterns of the printing layer.

DETAILED DESCRIPTION OF THE PREFERRED EMBODIMENTS

Figure 1:
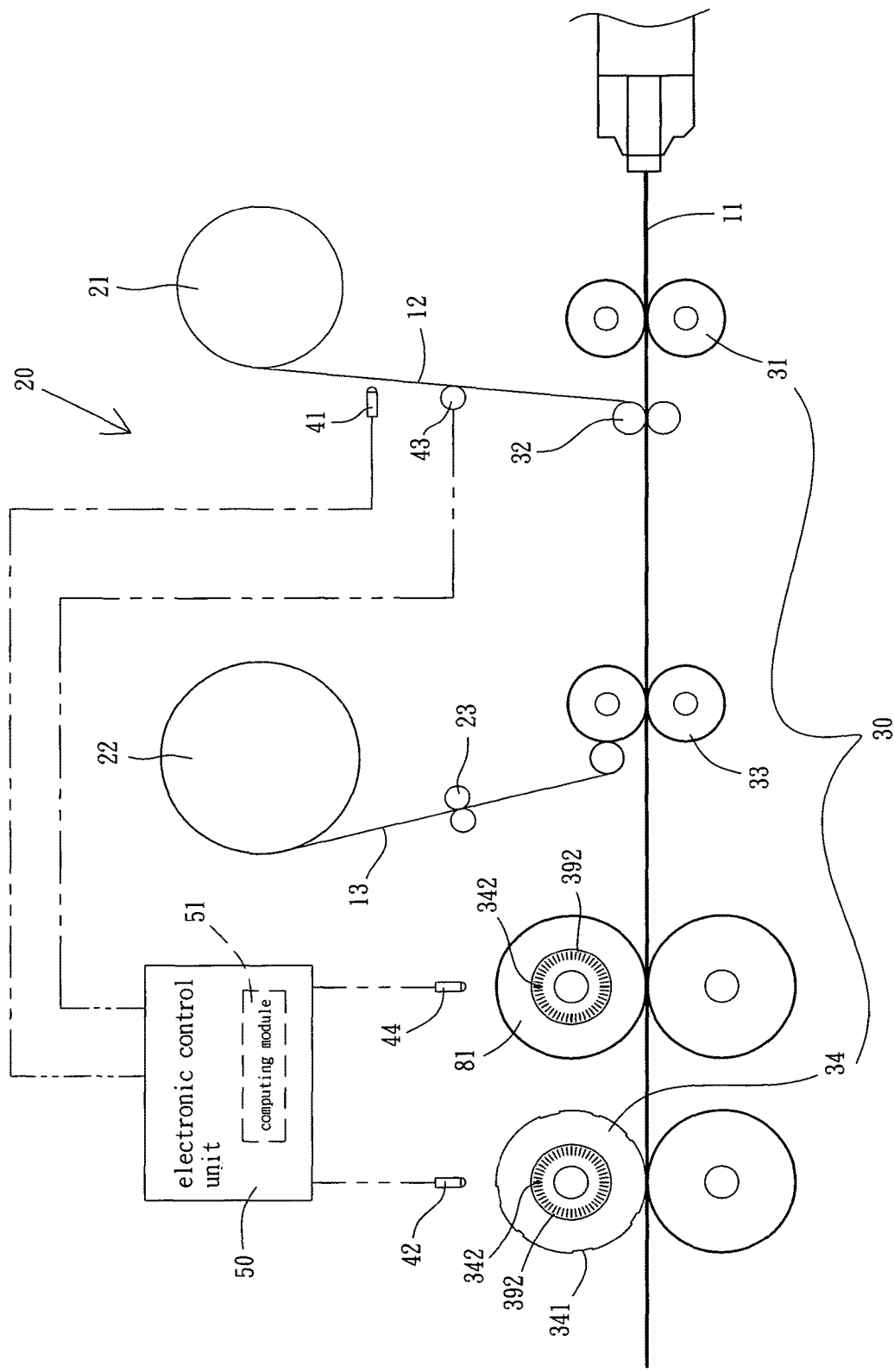
FIG. 1 is a schematic view showing the operation of plastic flooring having registration system according to a preferred embodiment of the present invention.

With reference to FIGS. 1 to 7, plastic flooring having registration system according to a preferred embodiment of the present invention comprises: a substrate 11, a printing layer 12, an abrasion resistance layer 13, and roller equipment 20 having a rolling device 30 configured to deliver and roll the substrate 11, the printing layer 12, and the abrasion resistance layer 13 so that the rolling equipment 20 rolls the substrate 11, the printing layer 12, and the abrasion resistance layer 13 together by mating with a registration system 20 and an electronic control unit 50, thus forming three-dimensional patterns on the plastic flooring.

The roller equipment 20 further includes a first delivery roller 21 configured to deliver the printing layer 12 toward the rolling device 30, a second delivery roller 22 configured to convey the abrasion resistance layer 13 toward the rolling device 30, and a feeding roller 23 configured to facilitate delivery stability toward the abrasion resistance layer 13.

As shown in FIG. 1, the registration transferring system 30 includes four roller sets horizontally arranged therein, for example, the registration transferring system 30 includes a first roller set 31 fixed on a machine frame configured to roll the substrate 11 in a predetermined thickness, a second roller 32 configured to roll the printing layer 12 onto the roller 11, a third roller set 33 configured to roll the abrasion resistance layer 13 onto the printing layer 12, and a fourth roller set 34 configured to roll the substrate 11, the printing layer 12, and the abrasion resistance layer 13.

Figure 2:
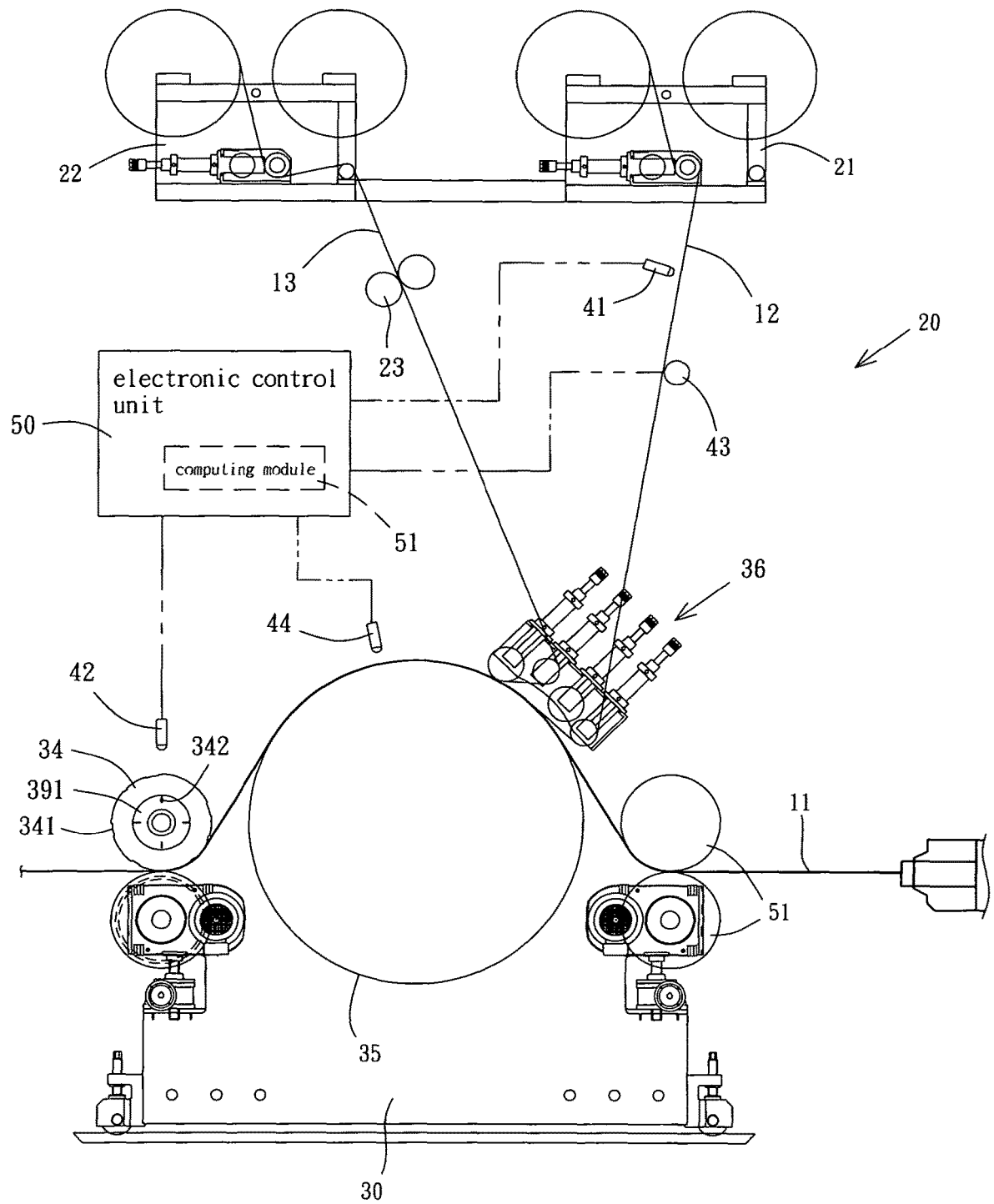
FIG. 2 is a schematic view showing the operation of plastic flooring having registration system according to another preferred embodiment of the present invention.

As illustrated in FIG. 2, the registration transferring system includes five roller sets horizontally arranged therein, for example, the registration transferring system 30 includes the first roller set 31, a fifth roller set 35, and the fourth roller set 34, wherein the printing layer 11 and the abrasion resistance layer 13 are guided toward the fifth roller set 35 by way of a guiding roller set 36 so that the printing layer 11 and the abrasion resistance layer 13 are rolled by the fifth roller set 35.

Figure 3:
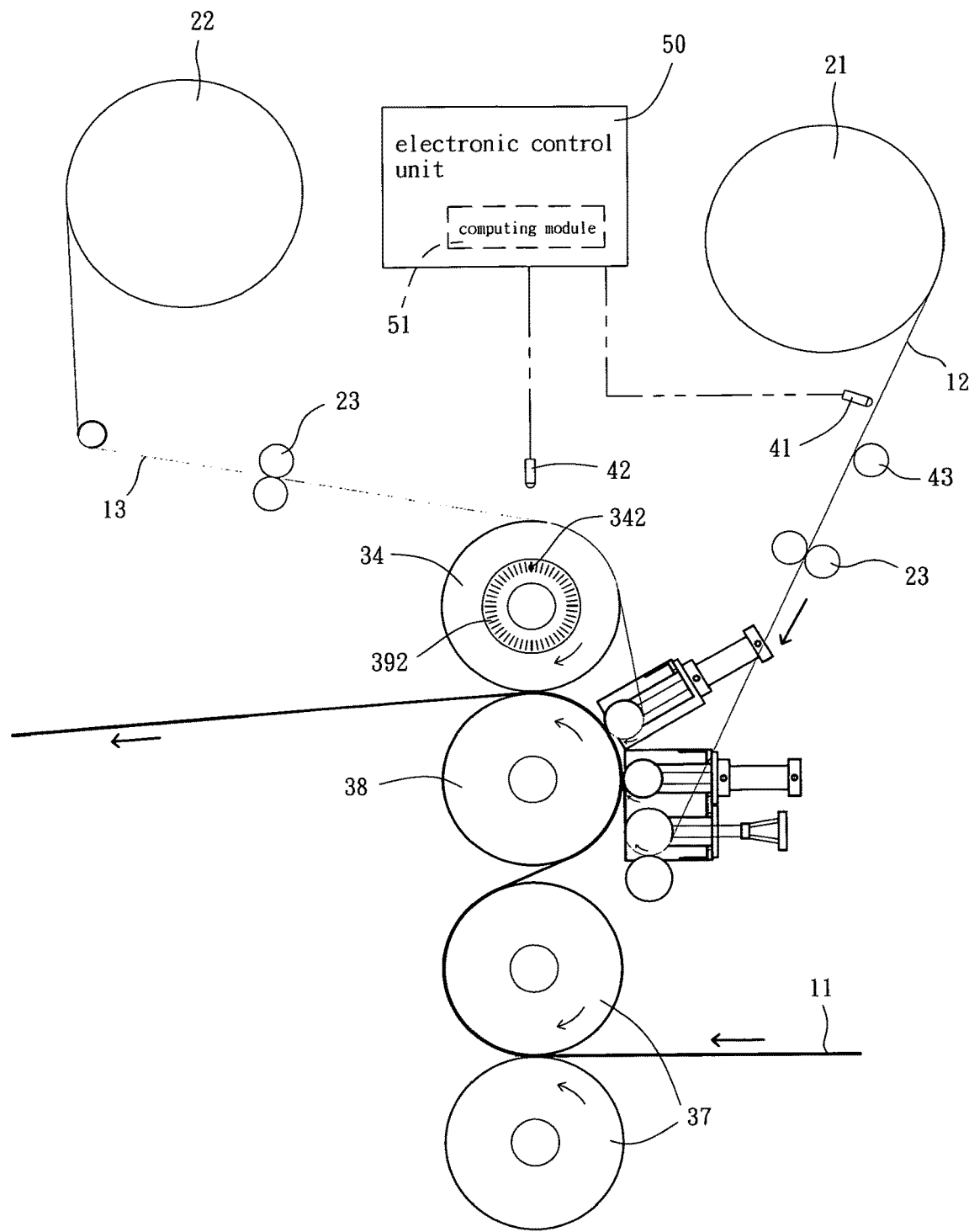
FIG. 3 is a schematic view showing the operation of plastic flooring having registration system according to another preferred embodiment of the present invention.
Figure 4:
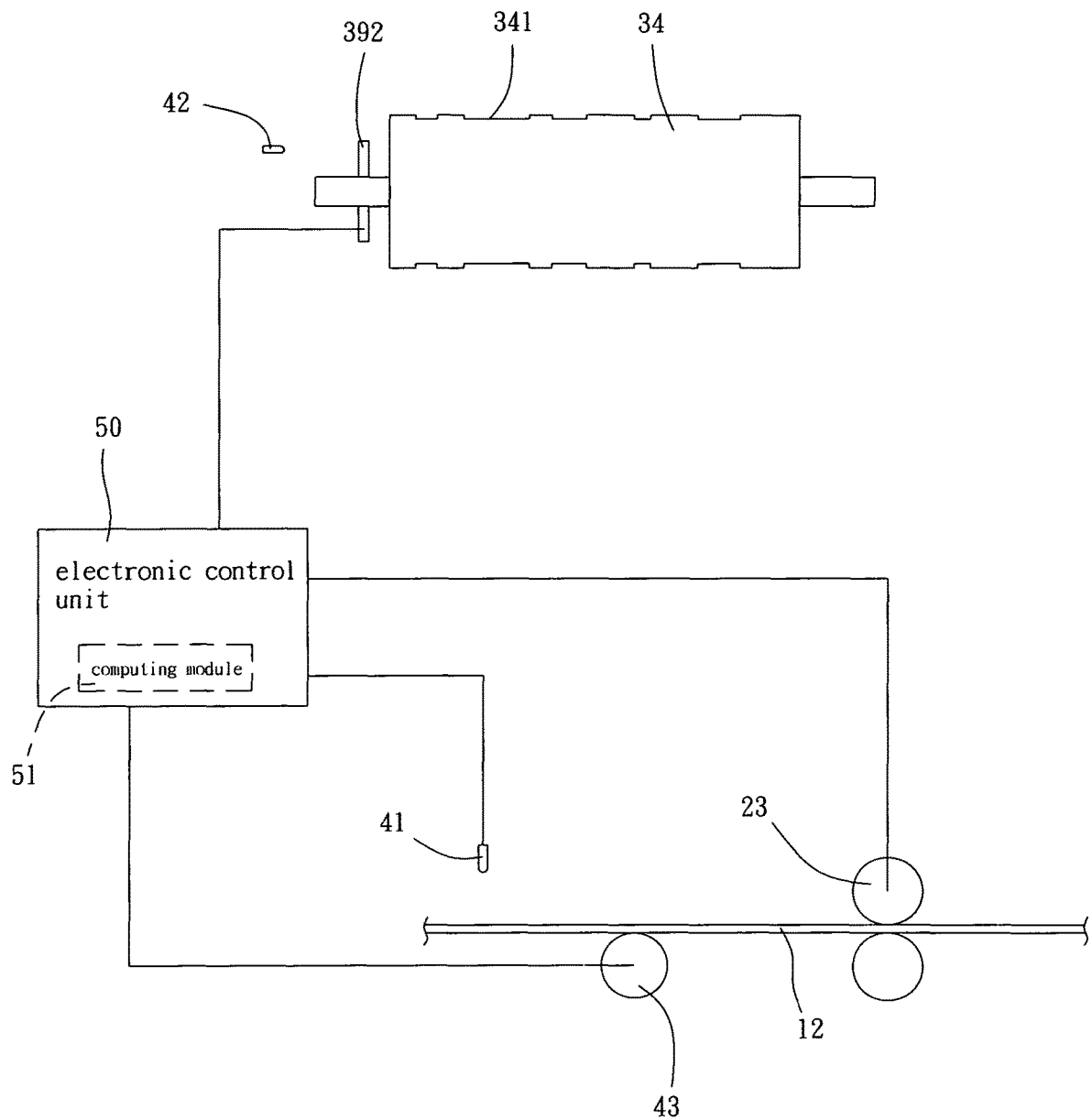
FIG. 4 is a schematic view showing the operation of a part of plastic flooring having registration system according to the preferred embodiment of the present invention.
Figure 5:
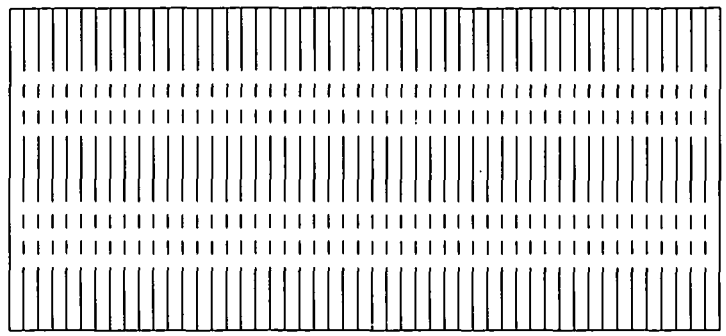
FIG. 5 is another schematic view showing the operation of a part of plastic flooring having registration system according to the preferred embodiment of the present invention.
Figure 6:
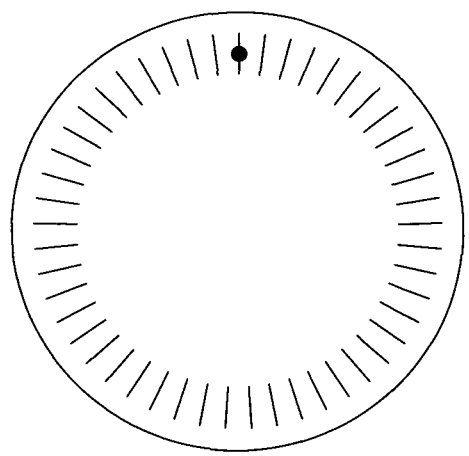
FIG. 6 is also another schematic view showing the operation of a part of plastic flooring having registration system according to the preferred embodiment of the present invention.
Figure 7:
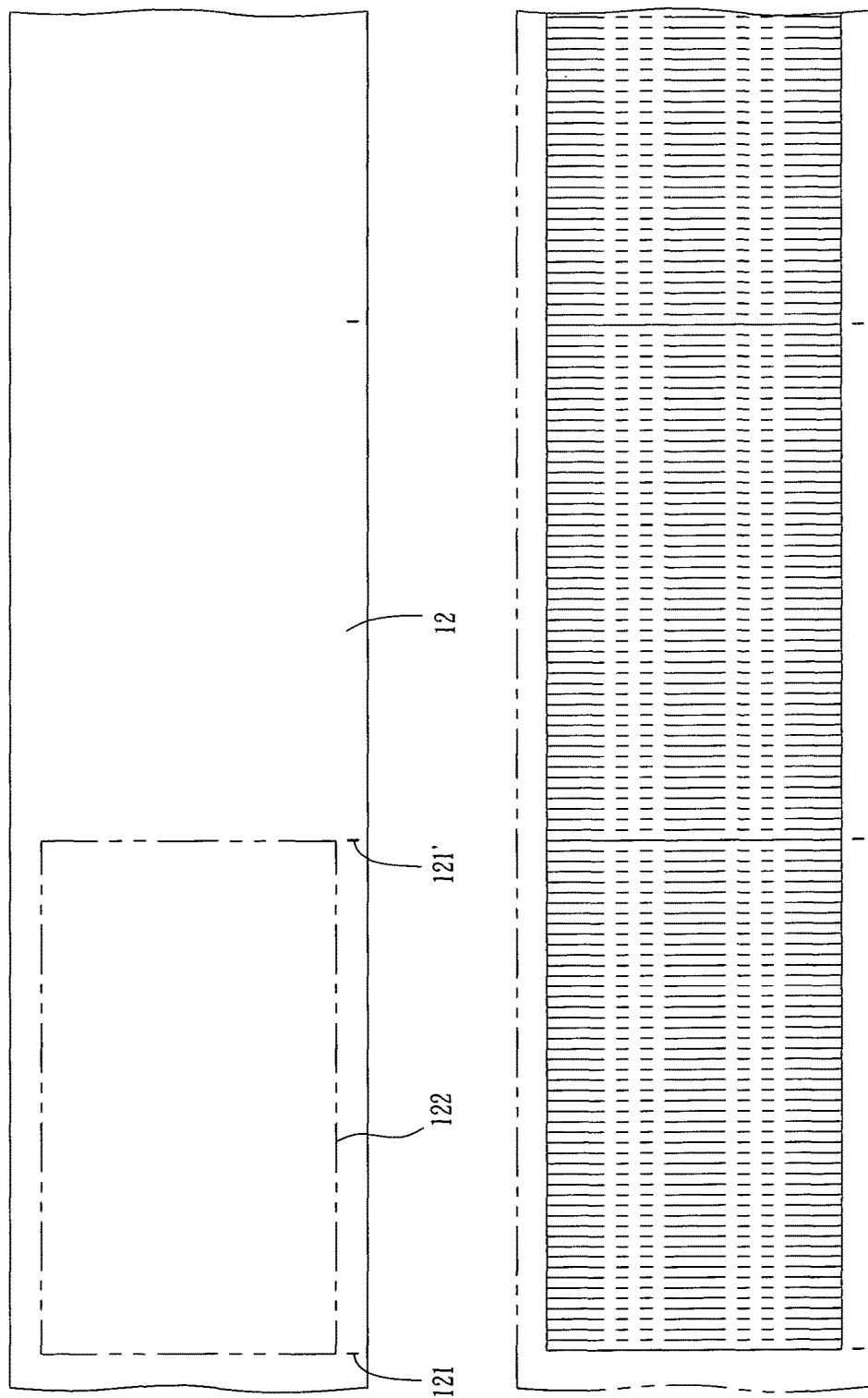
FIG. 7 is still another schematic view showing the operation of a part of plastic flooring having registration system according to the preferred embodiment of the present invention.
Figure 8:
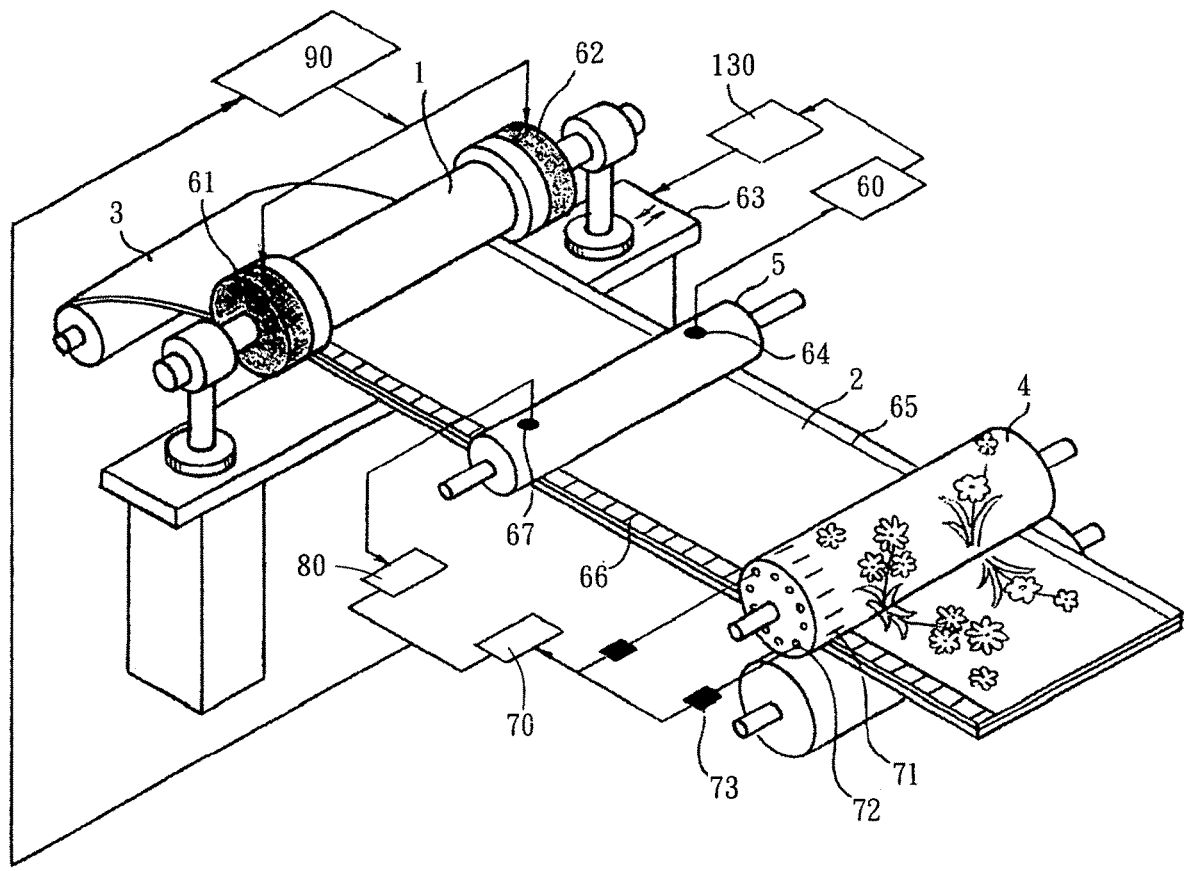
FIG. 8 is a perspective view of a conventional registration device.
Figure 9:
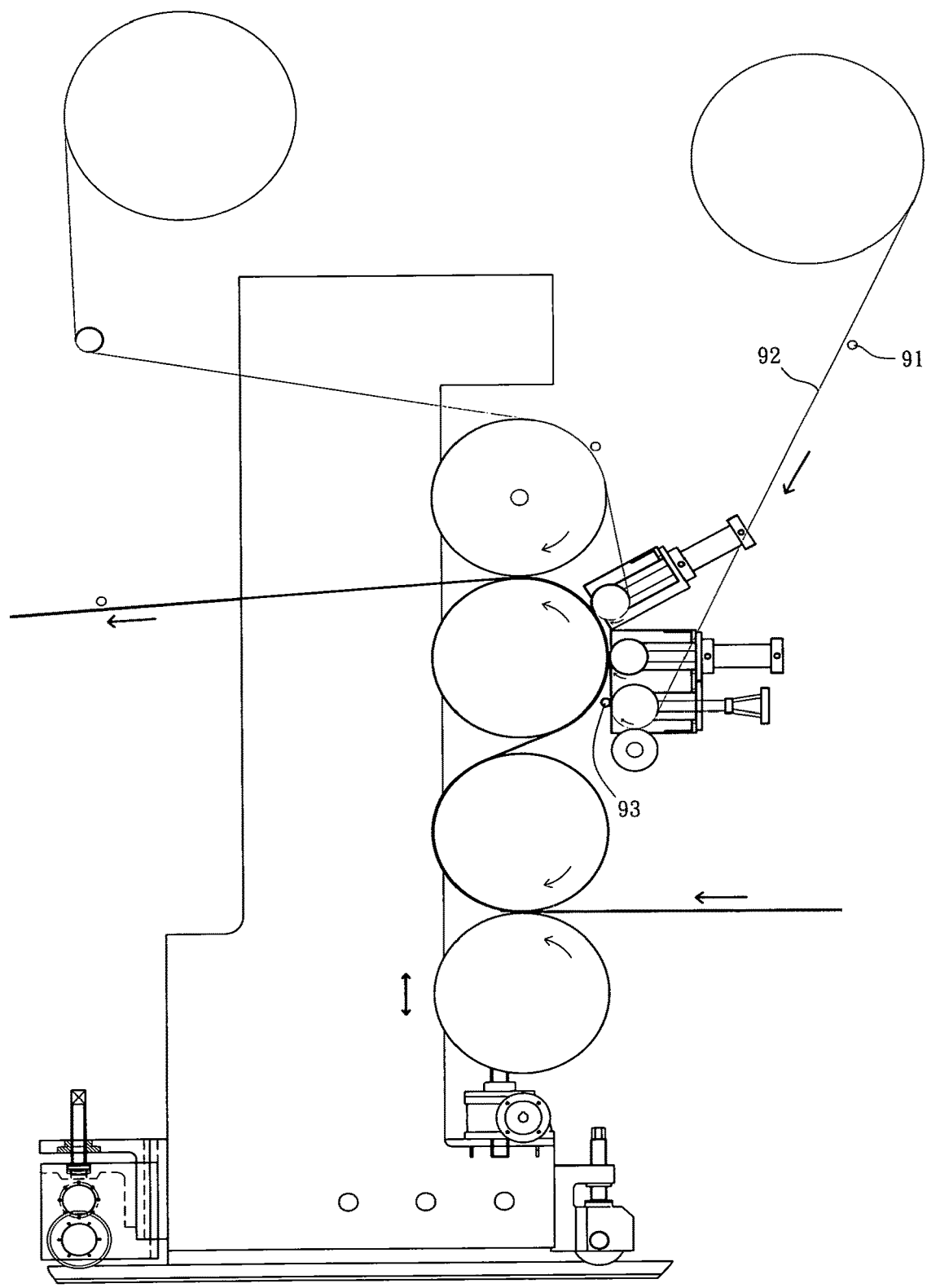
FIG. 9 is a schematic view of another conventional registration device.

As shown in FIG. 3, the registration transferring system 30 includes fourth roller sets vertically arranged therein, for example, the registration transferring system 30 includes two transportation rollers 37, a mirror roller 38, and a fourth roller set 34 which are arranged from a lower end of the machine frame to an upper end of the machine frame. The fourth roller set 34 has pressing patterns 341 formed thereon identical to surface patterns of the printing layer 12 so as to roll the base 11, the printing layer 12, and the abrasion resistance layer 13, thus forming the three-dimensional patterns on the plastic flooring.

The registration system 40 includes a first sensor 41, a second sensor 42, and a tension regulator 43.

The first sensor 41 is an electric eye or a camera and is disposed on a starting portion of a delivery path of the printing layer 12, wherein the printing layer 12 corresponds to a profile of the first sensor 41, the printing layer 12 has multiple positioning points 121 separated from one another, wherein a length between a first positioning point 121 and a second positioning point 121' depends on a perimeter of the fourth roller set 34 so as to form a print unit 122, and the perimeter of the fourth roller set 34 is more than a length of the print unit 12. The first sensor 41 is configured to sense the multiple positioning points 121 and transmits sensed signals to the electronic control unit 50.

The second sensor 42 is configured to sense rotation angle and location of the fourth roller set 34, wherein the fourth roller set 34 has at least one first start point 342 formed thereon so that the second sensor 42 sends sensed signal of the at least one first start point 342 to the electronic control unit 50.

The at least one first start point 342 is formed on two outer surfaces of the fourth roller set 34. Alternatively, a rotating disc 391 is rotatably connected on a rotary shaft of the fourth roller set 34 and the at least one first start point 342 is formed on the rotating disc 391, wherein the at least one first start point 342 is a signal receiving element, and the second sensor 42 transmits light signals. When the fourth roller set 34 rotates, the light signals contact with the at least one first start point 342 from the second sensor 42 so as to send the sensed signals toward the electronic control unit 50. Alternatively, the at least one first start point 342 is formed on an encoder 392, and the encoder 392 is fixed on the rotary shaft of the fourth roller set 34, wherein the second sensor 42 mates with the encoder 392 so as to sense an original position of the fourth roller set 34 or/and the rotation angle of the fourth roller set 34, and the second sensor 42 transmits the sensed signals to the electronic control unit 50.

The tension regulator 43 is mounted on a delivery start end of the printing layer 12 so as to adjust tension as delivering the printing layer 12.

The electronic control unit 50 is electrically connected with the roller equipment 20, the rolling device 30, and the registration system 40, wherein the electronic control unit 50 includes a computing module 51, when receiving the sensed signals of each positioning point 121 of the printing layer 12, the computing module 51 divides the print unit 122 into several parts evenly and constructs successive delivery simulation of a travel and a transportation speed from a delivery starting point to the fourth roller set 34.

When the electronic control unit 50 receives signals of the at least one first start point 342 of the fourth roller set 34, the computing module 51 simulates a divided number of the perimeter of the fourth roller set 34, and the divided number of the perimeter of the fourth roller set 34 is identical to a simulating number of the print unit 122 so as to compare simulated data of the printing layer 12 and that of the fourth roller set 34, hence when the base 11, the printing layer 12, and the abrasion resistance layer 13 are rolled by the fourth roller set 34, it is possible to judge whether the pressing patterns 341 correspond to the surface patterns of the printing layer 12. When a speed of the printing layer 12 is too fast or too slow, the tension regulator 43 adjusts the tension of the printing layer 12 so as to regulate an error between the pressing patterns 341 of the fourth roller set 34 and the surface patterns of the printing layer 12. When a divided number of each of the print unit 122 and the fourth roller set 34 increases, a judged value of the error is accurate more and more.

A rotation speed of the fourth roller set 34 is adjusted by mating a third sensor 44 or a fourth sensor 45 with a locating roller 39 so as to adjust the error between the pressing patterns 341 of the fourth roller set 34 and the surface patterns of the printing layer 12. When the error occurs, the tension regulator 43 adjusts the tension of the printing layer 12, and the rotation speed of the fourth roller set 34 is adjustable.

Referring to FIG. 1, when the roller equipment 20 does not roll the base 11, the printing layer 12, and the abrasion resistance layer 13, wherein the locating roller 39 is arranged adjacent to the fourth roller set 34 and its diameter is equal to that of the fourth roller set 34, and the perimeter of the locating roller 39 is identical to the length of the print unit 12, and the locating roller 39 has a second start point 391 formed on one side thereof and a third sensor 44 fixed outside the second start point 391 so that the third sensor 44 senses rotation of the locating roller 39 and transmits sensed information of the second start point 39 to the electronic control unit 50. Thereafter, the computing module 51 simulates a divided number of a perimeter of the locating roller 39 identical to that of the print unit 122, hence before the fourth roller set 34 rolls the printing layer 12, the simulated data of the printing layer 12 is compared with that of the locating roller 39 so as to judge whether the pressing patterns 341 of the fourth roller set 34 correspond to the surface patterns of the printing layer 12. When the speed of the printing layer 12 is too fast or too slow, the tension regulator 43 adjusts the tension of the printing layer 12. Alternatively, the rotation speed of the fourth roller set 34 is adjusted so as to regulate the error between the pressing patterns 341 of the fourth roller set 34 and the surface patterns of the printing layer 12.

As illustrated in FIG. 2, when the roller equipment 20 includes the fifth roller set 35 configured to roll the substrate 11, the printing layer 12, and the abrasion resistance layer 13, wherein the fourth sensor 45 is arranged adjacent to the fifth roller set 35, wherein after the substrate 11, the printing layer 12, and the abrasion resistance layer 13 are rolled, and the fourth sensor 45 senses the multiple positioning points 121 and transmits the sensed signals to the electronic control unit 50.

When the sensed signals of each positioning point 121 from the fourth sensor 45 are received by the electronic control unit 50, the computing module 51 compares whether a delivery travel of the printing layer 12 from the first sensor 41 to the second sensor 42 is equal to a delivery simulation travel of the computing module 51, thus judging whether the surface patterns of the printing layer 12 correspond to the pressing patterns 341 of the fourth roller set 34. When the speed of the printing layer 12 is too fast or too slow, the tension regulator 43 adjusts the tension of the printing layer 12. Alternatively, the rotation speed of the fourth roller set 34 is adjusted so as to regulate the error between the pressing patterns 341 of the fourth roller set 34 and the surface patterns of the printing layer 12.

Accordingly, the computing module 51 receives sensed values of the first sensors 41 and the second sensor 42 and compares the divided number so as to judge the error between the pressing patterns 341 of the fourth roller set 34 and the surface patterns of the printing layer 12. Thereafter, the tension regulator 43 and the fourth roller set 34 adjust the error so as to position the three-dimensional patterns accurately at a low cost.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. Plastic flooring having a registration system comprising:
    an electronic control unit electrically connected with roller equipment and the registration system, the roller equipment being configured to deliver a substrate, a printing layer, and an abrasion resistance layer toward a rolling device so that the rolling device rolls the plastic flooring, the rolling device including a fourth roller set having pressing patterns identical to surface patterns of the printing layer, and the registration system having a first sensor, a tension regulator, and a second sensor;
    wherein the first sensor is disposed on a delivery path of the printing layer, the printing layer is positioned relative to the first sensor, the printing layer has multiple positioning points separated from one another, wherein a length between a first positioning point of the multiple positioning points and a second positioning point of the multiple positioning points depends on a length of a peripheral side of the fourth roller set so as to form a print unit, and the first sensor is configured to sense the multiple positioning points and to transmit sensed signals with respect to the multiple positioning points to the electronic control unit;
    wherein the tension regulator is mounted on a delivery start end of the printing layer so as to adjust a tension as delivering the printing layer;
    wherein the second sensor is configured to sense rotation location of the fourth roller set, and the length of the peripheral side of the fourth roller set is equal to a length of the print unit of the printing layer, wherein the fourth roller set has at least one first start point formed thereon so that the second sensor sends a sensed signal of the at least one first start point to the electronic control;
    wherein the electronic control unit includes a computing module, when receiving the sensed signals of each positioning point of the multiple positioning points, the computing module divides the print unit into multiple parts evenly and constructs successive delivery simulation of a travel and a transportation speed from a delivery starting point to the fourth roller set; when the electronic control unit receives multiple signals of the at least one first start point of the fourth roller set, the computing module simulates a divided number of the perimeter of the fourth roller set, and the divided number of the perimeter of the fourth roller set is identical to a simulating number of the print unit so as to compare simulated data of the printing layer and that of the fourth roller set;
    when a speed of the printing layer is greater than a first predetermined value or is less than a second predetermined value, the tension regulator adjusts the tension of the printing layer so as to regulate an error between the pressing patterns of the fourth roller set and the surface patterns of the printing layer.

2. The plastic flooring as claimed in claim 1, wherein the length of the peripheral side of the fourth roller set is more than the length of the print unit of the printing layer.

3. The plastic flooring as claimed in claim 1, wherein the at least one first start point of the fourth roller set is formed on two outer surfaces of the fourth roller set or a rotating disc is rotatably connected on a rotary shaft of the fourth roller set and the at least one first start point of the fourth roller set is formed on the rotating disc, wherein the at least one first start point of the fourth roller set is a signal receiving element, and the second sensor transmits light signals.

4. The plastic flooring as claimed in claim 1, wherein the at least one first start point of the fourth roller set is formed on an encoder, and the encoder is fixed on a rotary shaft of the fourth roller set, wherein the second sensor mates with the encoder so as to sense an original position of the fourth roller set and/or a rotation angle of the fourth roller set, and the second sensor transmits the sensed signals with respect to the original position of the fourth roller set and/or the rotating angle of the fourth set to the electronic control unit.

5. The plastic flooring as claimed in claim 1, wherein a locating roller is arranged adjacent to the fourth roller set and a diameter of the locating roller is equal to a diameter of the fourth roller set, wherein a length of a peripheral side of the locating roller is identical to the length of the print unit, and the locating roller has a second start point formed on one side thereof and a third sensor fixed outside the second start point so that the third sensor senses rotation of the locating roller and transmits sensed information of the second start point to the electronic control unit, and the computing module simulates a divided number of the length of the peripheral side of the locating roller identical to a diameter of the print unit, hence before the fourth roller set rolls the printing layer, the simulated data of the printing layer is compared with simulated data of the locating roller so as to determine whether the pressing patterns of the fourth roller set matches with the surface patterns of the printing layer; when the speed of the printing layer is greater than the first predetermined value or is less than the second predetermined value, the tension regulator adjusts the tension of the printing layer, alternatively, the rotation speed of the fourth roller set is adjusted so as to regulate the error between the pressing patterns of the fourth roller set and the surface patterns of the printing layer.

6. The plastic flooring as claimed in claim 1, wherein when the roller equipment includes a fifth roller set configured to roll the substrate, the printing layer, and the abrasion resistance layer, wherein a fourth sensor is arranged adjacent to the fifth roller set, wherein after the substrate, the printing layer, and the abrasion resistance layer are rolled, and the fourth sensor senses the multiple positioning points and transmits sensed signals regarding the multiple positioning points to the electronic control unit.

\* \* \* \* \*